United States Patent
Matsuzawa et al.

(10) Patent No.: US 6,389,023 B1
(45) Date of Patent: May 14, 2002

(54) ROUTER DEVICE AND FRAME TRANSFER METHOD USING DATALINK LAYER FRAME SWITCHING

(75) Inventors: Shigeo Matsuzawa, Tokyo; Yasuhiro Katsube, Kanagawa, both of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/055,994

(22) Filed: Apr. 7, 1998

(30) Foreign Application Priority Data

Apr. 7, 1997 (JP) .............................................. 9-088163

(51) Int. Cl.[7] .............................................. H04L 12/56
(52) U.S. Cl. ............................. 370/395.31; 370/395.53; 370/469
(58) Field of Search ................................ 370/254, 255, 370/256, 257, 258, 389, 392, 393, 400, 401, 402, 403, 404, 405, 409, 428, 429, 475, 395.1, 395.2, 395.3, 395.31, 395.32, 395.5, 395.52, 395.53, 469

(56) References Cited

U.S. PATENT DOCUMENTS

| | | | | | |
|---|---|---|---|---|---|
| 5,796,740 A | * | 8/1998 | Perlman et al. | ............. | 370/401 |
| 5,822,319 A | * | 10/1998 | Nagami et al. | ............. | 370/392 |
| 5,917,820 A | * | 6/1999 | Rekhter | ..................... | 370/392 |
| 5,949,786 A | * | 9/1999 | Bellenger | .................... | 370/401 |
| 6,023,733 A | * | 2/2000 | Periasamy et al. | .......... | 709/241 |
| 6,081,524 A | * | 6/2000 | Chase et al. | ................ | 370/389 |
| 6,185,213 B1 | * | 2/2001 | Katsube et al. | ............. | 370/397 |

* cited by examiner

Primary Examiner—Kwang B. Yao
(74) Attorney, Agent, or Firm—Foley & Lardner

(57) ABSTRACT

A router device and a frame transfer method capable of attaching a virtual identifier necessary for the datalink layer switching that improves a transfer efficiency at the router device. The router device receives a frame having a datalink flow identifier for identifying a flow of a packet corresponding to the frame on a datalink layer, which is contained in a prescribed region of the frame corresponding to an upper layer protocol identification information region of a frame format for frames to be transferred via a network layer processing, and transfers the frame received from a previous hop node to the next hop node by obtaining the address information of the next hop node by referring to the memory unit using at least the datalink flow identifier contained in a prescribed region of the frame as a key, and by attaching the address information of the next hop node to the frame, without carrying out the network layer processing, where the memory unit stores a correspondence of the datalink flow identifier and an address information of the next hop node.

38 Claims, 6 Drawing Sheets

FIG.4

| CUT-THROUGH IDENTIFIER ~501 | OUTPUT INTERFACE ~502 | NEXT HOP CUT-THROUGH IDENTIFIER ~503 |
|---|---|---|
|  |  |  |
|  |  |  |
|  |  |  |

ROUTER DEVICE AND FRAME TRANSFER METHOD USING DATALINK LAYER FRAME SWITCHING

BACKGROUND OF THE INVENTION

1. Field of the Invention

The present invention relates to a router device and a frame transfer method for interconnecting communication networks such as Ethernets and transferring frames therebetween.

2. Description of the Background Art

The router device is a device used for interconnecting different LANs (Local Area Networks) and transferring datagrams from one LAN to another LAN. Datagram contains communication data to be transferred as well as network layer addresses (such as IP addresses in the case of IP (Internet Protocol)) for its source and final destination, so that the router device determines an output network interface and a transfer target node (a router device or host) for the datagram using that address information.

In the conventional router device, when a datalink layer frame (MAC (Media Access Control) frame) defined in the datalink layer (MAC layer) is received from LAN, the datalink layer processing applied to the received frame, and then this frame is converted into a packet (datagram) suitable for handling in the network layer. Then, according to the final destination network layer address contained in that datagram, an output interface and a network layer address of a next hop node for this datagram are determined, and this datagram is given to the determined output interface. The output interface then forms a datalink layer frame by determining a datalink layer address from the network layer address of the next hop node and outputs this datalink layer frame to LAN.

The router device for transferring communication data (datalink layer frame) by the above described procedure carries out the operation for converting the received datalink layer frame into a network layer packet, determining a node to which this packet is to be transferred next (a next hop router or a destination host) and an output interface according to a routing table provided at the router device by referring to the content of this packet such as its final destination address and source address, converting this packet back into the datalink layer frame, and outputting this datalink layer frame to the next hop mode.

In this operation, a processing load within the router and a processing time required for the transfer of received datalink layer frame are quite large in the case of conventional router device because of the heavy router processing such as the conversion of a received datalink layer frame into a network layer packet, the searching through the routing table, and the convention of a packet into a datalink frame.

In order to reduce the processing load of the above described router processing, there are propositions of a scheme for determining a frame transfer target in the datalink layer level, without referring to information in the network layer level described in the packet. This transfer scheme will be referred to as a cut-through transfer in the following.

One proposition is a scheme for enabling the switching at the datalink layer frame level by attaching a virtual identifier assigned in correspondence to a final destination information or a source information, to an intermediate header information described in the datalink layer frame (such as LLC (Logical Link Control) header in the case of LAN, for example) (see Y. Rekhter et al., "Tag Switching Architecture—Overview", Internet Draft draft-rekhter-tagswitch-arch-00.txt, January 1997).

In this scheme, upon receiving a frame, the router device determines whether this frame should be transferred by applying the ordinary network layer datagram processing or the cut-through transfer for maintaining a form of the datalink layer frame should be carried out for this frame, by inspecting the LLC header. When the cut-through transfer should be carried out, the datalink layer switching transfer according to a virtual identifier added to an intermediate header information is carried out.

However, in this scheme, a new information of several octets length is to be added to the header information so that a length of a portion within a frame into which the upper layer datagram can be entered becomes shorter. This implies that the maximum packet length that can be used at a time of the datalink layer frame switching becomes different from the maximum packet length that can be used at a time of the ordinary datagram transfer. As a consequence, when a datagram is transmitted from a source host which is not supporting this scheme, there is a need for the first router to re-adjust the packet length. In addition, even at a node that supports this scheme, there is a need to carry out the network layer processing such as that for changing a packet length at a time of switching from the ordinary transfer to the datalink layer switching transfer.

Another proposition is a scheme for attaching a virtual identifier necessary for the datalink layer switching by using a local address field defined in the datalink layer address that is to be used by LAN (see Japanese Patent Application No. 8-264011 (1996)).

In this scheme, a dedicated virtual identifier is assigned to each packet flow to be transferred by the cut-through transfer, and this virtual identifier is entered into a destination MAC address field or a source MAC address field of a frame. Then, upon receiving a frame for which either MAC address is local, the router device carries out the datalink layer switching transfer according to the virtual identifier described in that MAC address field.

In the case where the virtual identifier is to be described in the destination MAC address field, there is a need for each receiving node (router or host) to store a new MAC address in order to make it possible to receive that local destination MAC address. Consequently, when it is desired to carry out the datalink layer switching with respect to many packet flows separately, there is a need for each node to store many virtual identifies as MAC addresses to be received.

In addition, in this case, when an Ethernet switch exists between nodes as in the case of Ethernet, it is also necessary to store many MAC addresses within an Ethernet switch so that the Ethernet switch can relay a frame with a local destination MAC address to an appropriate node.

On the other hand, in the case where the virtual identifier is to be described in the source MAC address field, a bridge device having a learning function that constitutes LAN will learn many source MAC addresses that would have been unnecessary otherwise, so that a MAC address storage region within the bridge device will be consumed extensively.

SUMMARY OF THE INVENTION

It is therefore an object of the present invention to provide a router device and a frame transfer method capable of attaching a virtual identifier necessary for the datalink layer switching in such a manner that a transfer efficiency at the router device can be improved by utilizing the switching at the datalink layer frame level, without causing a need for re-adjusting or changing a packet length or a need for storing many MAC addresses at node, bridge, Ethernet switch, etc.

According to one aspect of the present invention there is provided a router device, comprising: a receiving unit for receiving a frame to be transferred by a datalink layer level switching, said frame having a datalink flow identifier for identifying a flow of a packet corresponding to said frame on a datalink layer, the datalink flow identifier being contained in a prescribed region of said frame corresponding to an upper layer protocol identification information region of a frame format for frames to be transferred via a network layer processing; a memory unit for storing a correspondence of the datalink flow identifier and an address information of a next hop node to which frames of packets belonging to said flow are to be transferred next; and a datalink layer level transfer unit for transferring said frame received from a previous hop node belonging to one logical network by the receiving unit to the next hop node belonging to another logical network, by obtaining the address information of the next hop node by referring to the correspondence stored by the memory unit using at least the datalink flow identifier contained in said prescribed region of said frame as a key, and by attaching the address information of the next hop node to said frame, without carrying out the network layer processing.

According to another aspect of the present invention there is provided a method of frame transfer at a router device, comprising the steps of: (a) storing a correspondence of a datalink flow identifier for identifying each flow on a datalink layer and an address information of a next hop node to which frames of packets belonging to each flow are to be transferred next in a memory of the router device; (b) receiving a frame to be transferred by a datalink layer level switching, said frame having the datalink flow identifier for identifying a flow of a packet corresponding to said frame on the datalink layer, the datalink flow identifier being contained in a prescribed region of said frame corresponding to an upper layer protocol identification information region of a frame format for frames to be transferred via a network layer processing; and (c) transferring said frame received from a previous hop node belonging to one logical network by the step (a) to the next hop node belonging to another logical network, by obtaining the address information of the next hop node by referring to the correspondence stored by the memory using at least the datalink flow identifier contained in said prescribed region of said frame as a key, and by attaching the address information of the next hop node to said frame, without carrying out the network layer processing.

Other features and advantages of the present invention will become apparent from the following description taken in conjunction with the accompanying drawings.

BRIEF DESCRIPTION OF THE DRAWINGS

FIG. 4 is a diagram showing an exemplary configuration of a next hop information table used in the case of datagram processing procedure of FIG. 3.

DETAILED DESCRIPTION OF THE PREFERRED EMBODIMENTS

Referring now to FIGS. 1A to 1E to FIG. 6, the preferred embodiment of a router device and a frame transfer method according to the present invention will be described in detail. In the following, a datalink layer frame will be abbreviated as a MAC frame for the sake of simplicity.

Figure 1A:
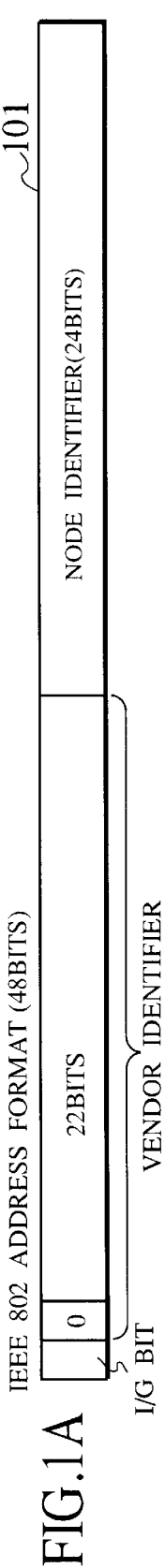
FIGS. 1A and 1B are diagrams showing exemplary MAC address formats that can be used in a router device and a frame transfer method according to the present invention.
Figure 1B:
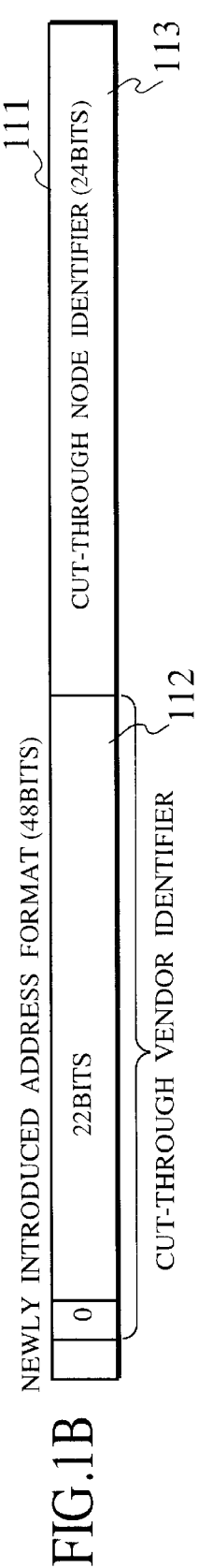
Figure 1C:
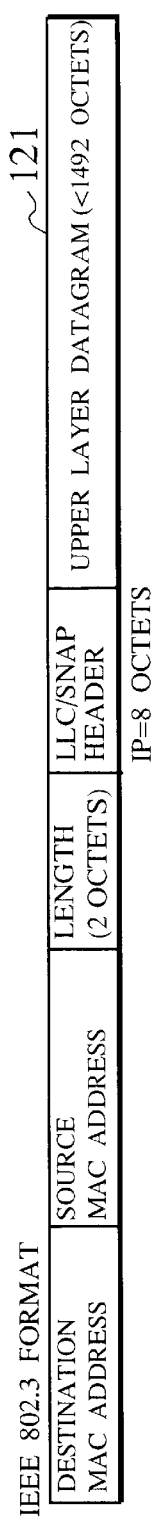
FIGS. 1C, 1D and 1E are diagrams showing exemplary MAC frame formats that can be used in a router device and a frame transfer method according to the present invention.
Figure 1D:
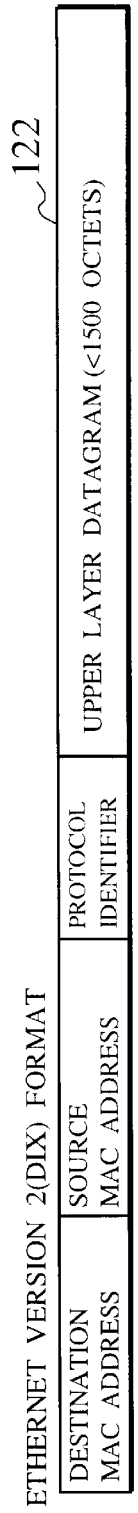
Figure 1E:
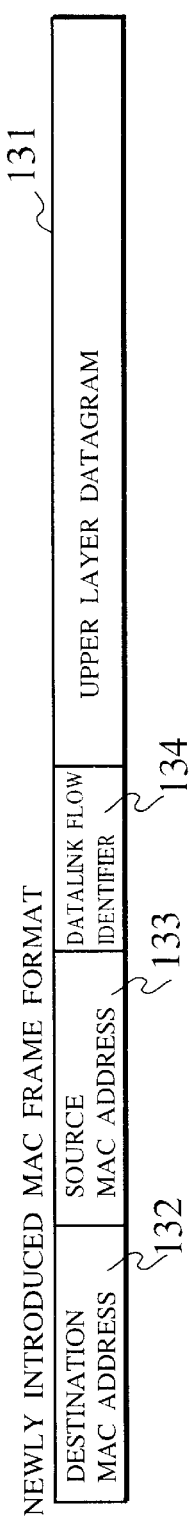

FIGS. 1A and 1B show exemplary MAC address formats that can be used in this embodiment and FIGS. 1C, 1D and 1E show exemplary MAC frame formats that can be used in this embodiment.

An address format 101 of FIG. 1A is an ordinary MAC address format defined by the IEEE 802 committee, which is segmented into a group identifier (I/G bit) of 1 bit, a vendor identifier of 23 bits, and a node identifier of 24 bits. In the case of Ethernet, in particular, a top bit of the 23 bits vendor identifier is called a U/L bit, which is to be set to 0 in the case of global use.

An address format 111 of FIG. 1B is a new MAC address format to be used in the case of cut-through transfer according to this embodiment, which is based on the address format 101 of FIG. 1A. In this address format 111, a value which is understood over all networks in advance as specifically indicating a cut-through transfer will be entered as a cut-through vendor identifier 112. According to this cut-through vendor identifier 112, it becomes possible for each node to judge whether the cut-through transfer should be carried out or the ordinary datagram transfer should be carried for a received MAC frame.

On the other hand, a cut-through node identifier 113 is an identifier for identifying a node within each network in the case of carrying out the cut-through transfer, which can be either a value that is unique over all LANs (the all networks) or a value that is unique within each LAN. For the purpose of its use, it is sufficient to use a value which is unique within each LAN.

Thus each node is to be assigned with an ordinary node identifier used in the address format 101 of FIG. 1A and a cut-through node identifier used in the address format 111 of FIG. 1B. Note that when all network interfaces within one LAN belong to the same vendor (the same vendor identifier), it is possible to set the cut-through node identifier equal to the ordinary node identifier.

A MAC frame format 121 of FIG. 1C shows an IEEE 802.3 format as an exemplary MAC frame format defined by the IEEE 802 committee, where an LLC header (LLC/SNAP header) provided behind a destination MAC address, a source MAC address and a 2 octets frame length field identifies an upper layer protocol of subsequently entered upper layer datagram. For example, in the case of IP datagram, encapsulation using 8 octets header called LLC/SNAP header is used.

A MAC frame format 122 of FIG. 10 shows a DIX format for MAC frame defined by the Ethernet Version 2 on Ethernet, which is a MAC frame format used as default format in IP. In this MAC frame format 122, a 2 octets Type field (protocol ID) provided behind a destination MAC address and a source MAC address identifies an upper layer protocol of subsequently entered upper layer datagram.

In the case of Ethernet, The maximum datagram length (referred hereafter as MTU) available for the upper layer protocol is different for the MAC frame format 121 and the MAC frame format 122. More specifically, it is 1492 octets for the MAC frame format 121 and 1500 octets for the MAC frame format 122.

A MAC frame format 131 of FIG. 1E shows a new MAC frame format to be used in the case of cut-through transfer according to this embodiment. This MAC frame format 131 inserts a datalink flow identifier 134 behind a destination MAC address 132 and a source MAC address 133, As will be described in detail below, there are two cases including a case of entering address according to the address format 111 into the destination MAC address 132 side and a case of entering address according to the address format 111 into the source MAC address 133 side. In the following, a combination of the destination MAC address or source MAC address according to the address format 111 and the datalink flow identifier 134 will be referred to as a cut-through identifier. Note that the cut-through identifier is an example of a virtual identifier necessary for the datalink layer switching as described above.

Note here that the datalink flow identifier is an information to be used in combination with the upstream side or downstream side cut-through node identifier by an upstream node and a downstream node in order to uniquely identify on the datalink layer level a packet flow for which the cut-through transfer should be carried out. In other words, a node that received a frame can determine on the datalink layer lever a packet flow to which this frame belongs by looking at the datalink flow identifier (and the cut-through node identifier if necessary) contained in this frame, so that this node can transfer this frame without analyzing the packet flow by the network layer processing.

Note also that a general flow identification information used for the purpose of identifying the packet flow on the network layer level is defined to be unique over all networks, but it is sufficient for the datalink flow identifier to enable an upstream node and a downstream node that share this datalink flow identifier to identify the packet flow by using this datalink flow identifier. For this reason, the upstream node and the downstream node exchange a message for establishing a correspondence between the cut-through identifier containing the datalink flow identifier and a network layer level flow identification information of a packet flow represented by that datalink flow identifier, prior to the actual transfer of cut-through frames. A value of the cut-through identifier may be determined by the upstream node and notified to the downstream node, or determined by the downstream node and notified to the upstream node, or else determined by the downstream node in response to a request from the upstream node and returned to the upstream node.

The cut-through identifier is to be so determined that a packet flow for which the cut-through transfer should be carried out can be uniquely identified at least within each network. When one cut-through node identifier is assigned to one node, cut-through virtual paths to be exclusively used respectively by as many packet flows as a number of available datalink flow identifiers can be set up with respect to that one node. Note that a packet flow can be defined in terms of any one or combination of a final destination address, a final destination port, a sequence address, and a source port on the network layer, for example.

As for a length of the datalink flow identifier, it is preferable to use a fixed length over all the networks from a viewpoint of operation. A preferable value of the datalink flow identifier length is 2 octets, which is an encapsulation length used in a MAC frame in the Ethernet DIX format of FIG. 1D, so as to be able to realize the equal length for the MTU size in the case of the ordinary datagram transfer and the MTU size in the case of the cut-through transfer using a MAC frame in the MAC frame format of FIG. 1E regardless of the encapsulation scheme used.

When the datalink flow identifier length is set to be 2 octets, a number of available cut-through identifiers for one cut-through node identifier (MAC address in the address format of FIG. 1B) becomes 65536. Namely, by storing (learning) just one cut-through MAC address at the Ethernet switch or a bridge device having a learning function, it becomes possible to carry out the datalink layer switching for each one of 65536 sets of packet flows.

In view of an increasing number of hosts and router devices in Internet, as many as 65536 sets of cut-through identifiers may not be sufficiently many. In such a case, a single router device can be assigned with more than one cut-through node identifiers for the purpose of identifying all these hosts and router devices. Even in such a case, an amount of MAC addresses to be stored (learned) can be only as many as a number of assigned cut-through node identifiers.

Figure 2:
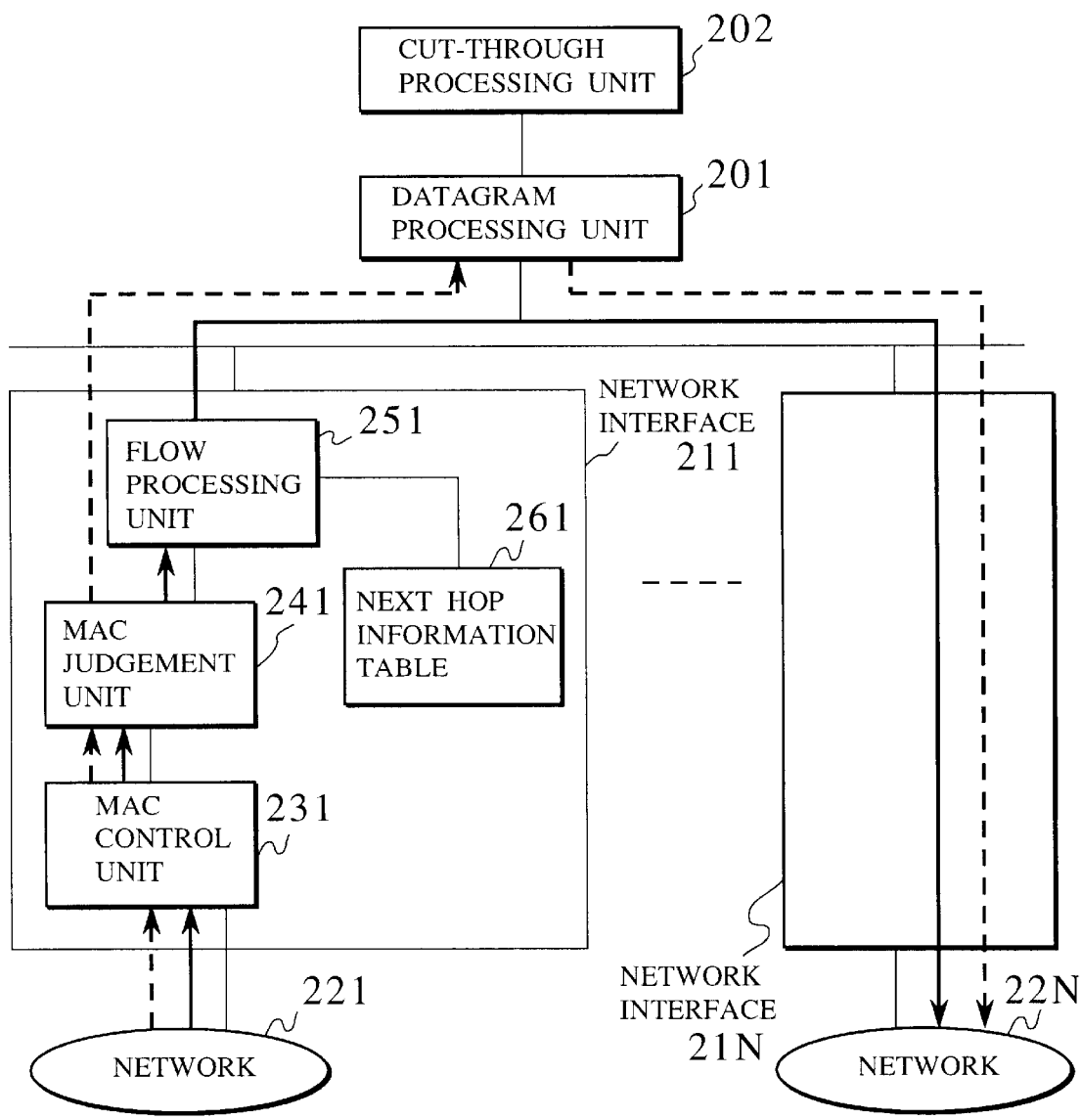
FIG. 2 is a block diagram of an exemplary configuration of a router device according to the present invention.

FIG. 2 shows an exemplary configuration of a router device according to this embodiment, for realizing high speed transfer using the MAC frame format of FIG. 1E.

This router device of FIG. 2 has one or more network connection interface 211 to 21N, which are respectively connected to networks 221 to 22N. Here, the networks 221 to 22N are networks as standardized by the IEEE 802 committee. such as Ethernets (802.3) or Token Rings (802.5) for example.

A datagram processing unit 201 carries out a network layer processing with respect to packets obtained by assembling received frames at each network interface 211 to 21N. Namely, this datagram processing unit 201 has a function for carrying out the processing to determine a router or host to which the packet is to be transferred next and a corresponding network connection interface, according to a destination information of a datagram such as that of IP. It is to be noted that this datagram processing unit 201 is not an indispensable element of the router device according to the present invention, and can be omitted if desired.

A cut-through processing unit 202 carries out a protocol processing necessary in order to realize the cut-through transfer (datalink layer switching) using the MAC frame format of FIG. 1E. Namely, this cut-through processing unit 202 exchanges messages containing the datalink flow identifier and the network layer flow identification information with a neighboring node, so as to obtain a consensus as to which cut-through identifier should be used in realizing the cut-through transfer for a particular packet flow and sets up a next hop information table 261 to be described below according to the obtained consensus. The cut-through processing unit 202 may also store the cut-through MAC address if necessary. As a protocol to be used here, FANP (Flow Attribute Notification Protocol) or TDP (Tag Distribution Protocol) proposed in the IETF can be used.

Each network interface 211 to 21N has the identical configuration as shown only for the network interface 211 in FIG. 2 for the sake of simplicity. The network interface 211 comprises a MAC control unit 231, a MAC judgement unit 241, a flow processing unit 251, and a next hop information table 261.

The MAC frame control unit 231 carries out a MAC frame transmission and reception processing, which normally receives MAC frames or broadcast MAC frames having a MAC address of this router device as their destination. Here, however, it is also possible for the MAC frame control unit 231 to receive some other MAC frames by using appropriate setting so as to be able to receive MAC frames having a group address as their destination as well.

The MAC judgement unit 241 makes a judgement as to whether a received MAC frame is a MAC frame having the MAC address format of FIG. 1B or not, and sends the received MAC frame to the flow processing unit 251 when the received MAC frame has the MAC frame format of FIG. 1E (the case of carrying out the cut-through transfer), or sends the received MAC frame to the datagram processing unit 201 otherwise (the case of carrying out the ordinary network layer transfer).

The flow processing unit 251 obtains information such as a network connection interface to which the MAC frame should be transferred and a next hop cut-through identifier by searching through the next hop information table 261 according to the cut-through MAC address information (which can be just the cut-through node identifier) and the datalink flows identifier contained in the MAC frame, rewrites the header information of the MAC frame if necessary, and transfers the MAC frame to the obtained network connection interface directly (without passing through the datagram processing unit 201).

Figure 3:
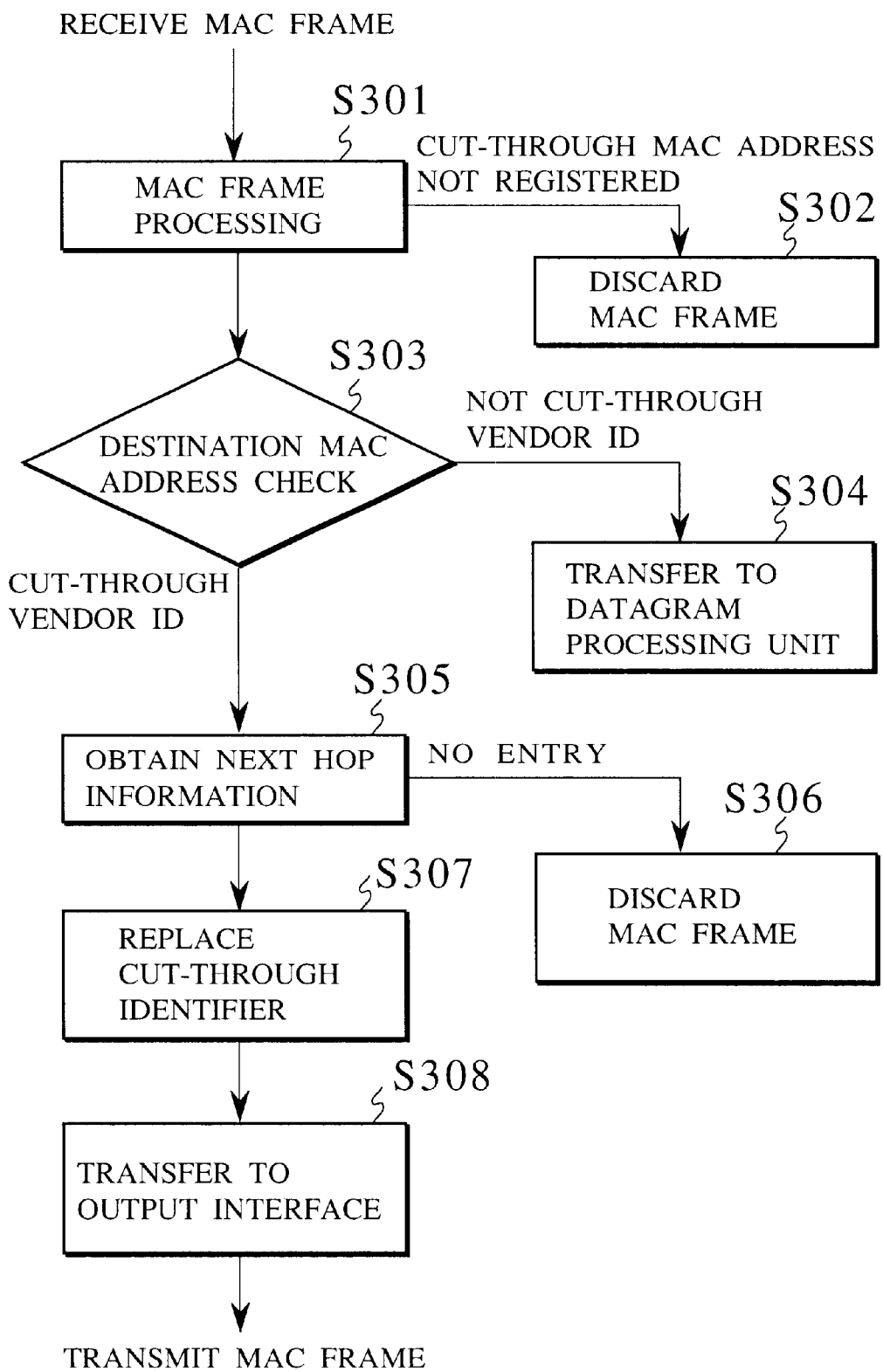
FIG. 3 is a flow chart for a datagram processing procedure to be carried out by the router device of FIG. 2 in the case of entering the cut-through MAC address into the destination MAC address region.

FIG. 3 shows a datagram processing procedure to be carried out by the router device of FIG. 2 in the case of entering the cut-through MAC address into the destination MAC address region. Here, an exemplary case of datagram transfer from the network interface 211 to the network interface 21N will be described.

First, the network interface 211 receives a MAC frame from the network 221. At this point, the MAC control unit 231 executes the MAC frame processing (such as a destination MAC address check, CRC check, etc.), and sends this MAC frame to the MAC judgement unit 241 when the destination MAC address of the received MAC frame is stored as an address to be received by this router device (S301). Namely, when the destination MAC address is either an ordinary MAC address of this router device or a cut-through MAC address assigned to this router device (that is, the cut-through vendor identifier+the cut-through node identifier assigned to this router device), the received MAC frame is given to the MAC judgement unit 241. The received MAC frame is discarded otherwise (S302).

Prior to this, the cut-through MAC address assigned to this router device is stored in the MAC control unit 231 by the cut-through processing unit 202. Also, when there exists an Ethernet switch between this router device and a neighboring node, the cut-through processing unit 202 of this router device transmits to the neighboring node a frame in which the cut-through MAC address is entered as a source MAC address when the cut-through MAC address is assigned to this router device. By receiving this frame, the Ethernet switch in the middle stores information on an output interface to which a frame having that cut-through MAC address as a destination MAC address should be transferred.

In addition, by receiving the above noted frame, each node can store the cut-through MAC address of its neighboring node. It is also possible to define a separate procedure for exchanging the cut-through MAC address between neighboring nodes such as a query and response type procedure or a one-way notification procedure.

Upon receiving the MAC frame from the MAC control unit 231, the MAC judgement unit 241 checks the vendor identifier of the destination MAC address (S303), and sends the MAC frame to the flow processing unit 251 in order to carry out the cut-through transfer when the vendor identifier is the cut-through vendor identifier (S305), or sends the MAC frame to the datagram processing unit 201 in order to carry out the ordinary network layer transfer when the vendor identifier is not the cut-through vendor identifier (S304).

Next, the flow processing unit 251 refers to the next hop information table 261 so as to obtain an output network interface to which the to which this MAC frame should be sent next and a cut-through identifier to be attached to this MAC frame next, according to the datalink flow identifier contained in this MAC frame (S305). Here, the searching through the next hop information table 261 is carried out by using the datalink flow identifier as a key, but it is also possible to carry out this search by using the cut-through identifier as a key. In particular, when a plurality of cut-through identifiers are to be assigned to a single node, it is more preferable to carry out this search by using the cut-through identifier as a key.

When no corresponding entry is found by the search through the next hop information table 261 by the flow processing unit 251, this MAC frame is discarded (S306). For this reason, the source node is required to transmit packets belonging to that packet flow in forms of MAC frames in the MAC frame format 131 of FIG. 1E that contains the cut-through identifier, after being notified from its neighboring node that the neighboring node has set up the next hop information table according to exchange of message containing the datalink flow identifier an the network layer flow identification information. Until this notification, the packets belonging to that packet flow are transmitted in forms of MAC frames in the ordinary MAC frame format 121 or 122 of FIG. 1C or FIG. 1D so that the neighboring node can carry out the ordinary datagram transfer.

Note that, in a case where the message exchange for the cut-through processing has already been completed between a previous hop node and this router device but the similar message exchange has not been completed (or the similar message exchange has not initiated yet) between this router device and the next hop node, the step S306 can erroneously discard the MAC frame that should be transferred to the next hop node. In order to avoid this undesirable situation, it is possible to adopt any of the following three measures.

The first measure is to adopt a rule that, when the message exchange with the previous hop node is completed, an entry having a corresponding datalink flow identifier (or cut-through identifier) as a key is created in the next hop information table 261, and the output interface field is left empty or an information for indicating the sending to the datagram processing unit 201 is entered into the output interface field, while an upper layer protocol identification information such as LLC header alone is entered into the next hop cut-through identifier field. Then, when an entry found by the search through the next hop information table 261 at the step S305 is in this state, the MAC frame is given to the datagram processing unit 201 by using the upper layer protocol identification information.

The second measure is to adopt a rule that, when the message exchange with the previous hop node is completed, an entry having a corresponding datalink flow identifier (or cut-through identifier) as a key is created in the next hop information table 261, while an output interface to which the MAC frame is to be sent next and a destination MAC address of the next hop node are obtained from the final destination network layer address of the packet flow identified by that datalink flow identifier by the datagram processing, and the obtained information and other necessary information such as LLC header and the protocol identifier are entered into the output interface field and the next hop cut-through identifier field. When this is done, the steps S307 and S308 to be described below will be carried out for the MAC frame to which this entry in the next hop information table 261 corresponds, so that it becomes possible to carry out the datalink layer switching transfer at this router device even when the message exchange with the next hop node has not been completed.

The third measure is to adopt a rule that the MAC frame is to be given to the datagram processing unit 201 even when there is no corresponding entry in the next hop information table 261, and that the writing into the next hop information table 261 is to be made only after the message exchanges with the previous hop node and the next hop node are both completed. When this third measure is adopted. It is necessary to use a new address format in which 2 octets for example of the cut-through node identifier 113 are to be used for indicating the upper layer protocol identification information. Then, when the MAC frame intended for the cut-through transfer is received and this MAC frame is to be given to the datagram processing unit 201, the protocol identification information contained at a prescribed position in the cut-through node identifier is used.

Alternatively, in order to prevent the MAC frame with the cut-through vendor identifier from being transferred to this router device in a state where the setting for the cut-through transfer is completed only up to an intermediate node, it is also possible to require the source node of the MAC frames to transmit packets belonging to a specific packet flow by converting them into the cut-through MAC frames only after it is notified that the message exchange and the next hop information table set up are completed end-to-end, and to transmit the packets by converting them into the ordinary frames up until then.

Now, after the next hop information is obtained, the flow processing unit 251 replaces the destination MAC address and the datalink flow identifier of the received MAC frame to the obtained next hop cut-through identifier (S307), and sends this MAC frame to the obtained output network interface 21 (S308).

Here, the replacement of the destination MAC address and the datalink flow identifier is carried out in order to make it possible for each interface to manage the destination MAC address and the datalink flow identifier independently, and this operation will be unnecessary when the destination MAC address (cut-through MAC address) and the datalink flow identifier are set to be unique over all the networks.

The output networks interface 21N can then transfer the MAC frame exactly as received.

By the above processing, it is possible to realize the datagram transfer based on the datalink layer switching, without requiring the processing at the datagram processing unit 201.

FIG. 4 shows an exemplary configuration of the next hop information table 261 used in this case for obtaining information elements on the next hop router device or host from the cut-through identifier, in which each entry comprises a cut-through identifier field 501, an output interface field 502, and a next hop cut-through identifier field 503.

The cut-through identifier field 501 indicates a cut-through identifier which is to be used as a search key, although this field may be unnecessary depending on the search method adopted. As already mentioned above, it is also possible to use the datalink flow identifier as the search key instead of the cut-through identifier. The output interface field 502 indicates a network interface to which the MAC frame is to be sent next. The next hop cut-through identifier field 503 indicates a cut-through identifier of the next hop which is an information element necessary when it is required to replace the header information of the received MAC that contains the cut-through MAC address and the datalink flow identifier in order to transmit this MAC frame to the next hop router device or destination host.

Here, in the table entry for a next hop router or final destination host which does not support the newly introduced cut-through MAC frame format 131 of FIG. 1E, it is preferable to set a MAC address and an encapsulation information (such as LLC header) to be used for the ordinary datagram transfer, into the next hop cut-through identifier field 503. In other words, with respect to a node that does not support the cut-through MAC frame format 131 of FIG. 1E, the previous hop node transmits an ordinary MAC frame using ordinary MAC address and LLC header set in the next hop information table. When this is done, it becomes possible to realize the cut-through transfer at this router device even when the next hop router or host does not support the cut-through MAC frame format 131 of FIG. 1E.

Also, by adopting a scheme in which the ordinary MAC frame is to be transmitted to a next hop node that requires to apply the upper layer processing to the received MAC frame, that next hop node can operate without any problem even though the cut-through MAC frame does not contain the upper layer protocol identification information.

Note that, in the case of adopting an address format in which 2 octets for example of the cut-through node identifier 113 are to be used for indicating the upper layer protocol identification information, a node that requires to apply the upper layer processing to the received MAC frame (which also supports this address format) can operate without any problem even when the cut-through MAC frame is transmitted to that node.

Figure 5:
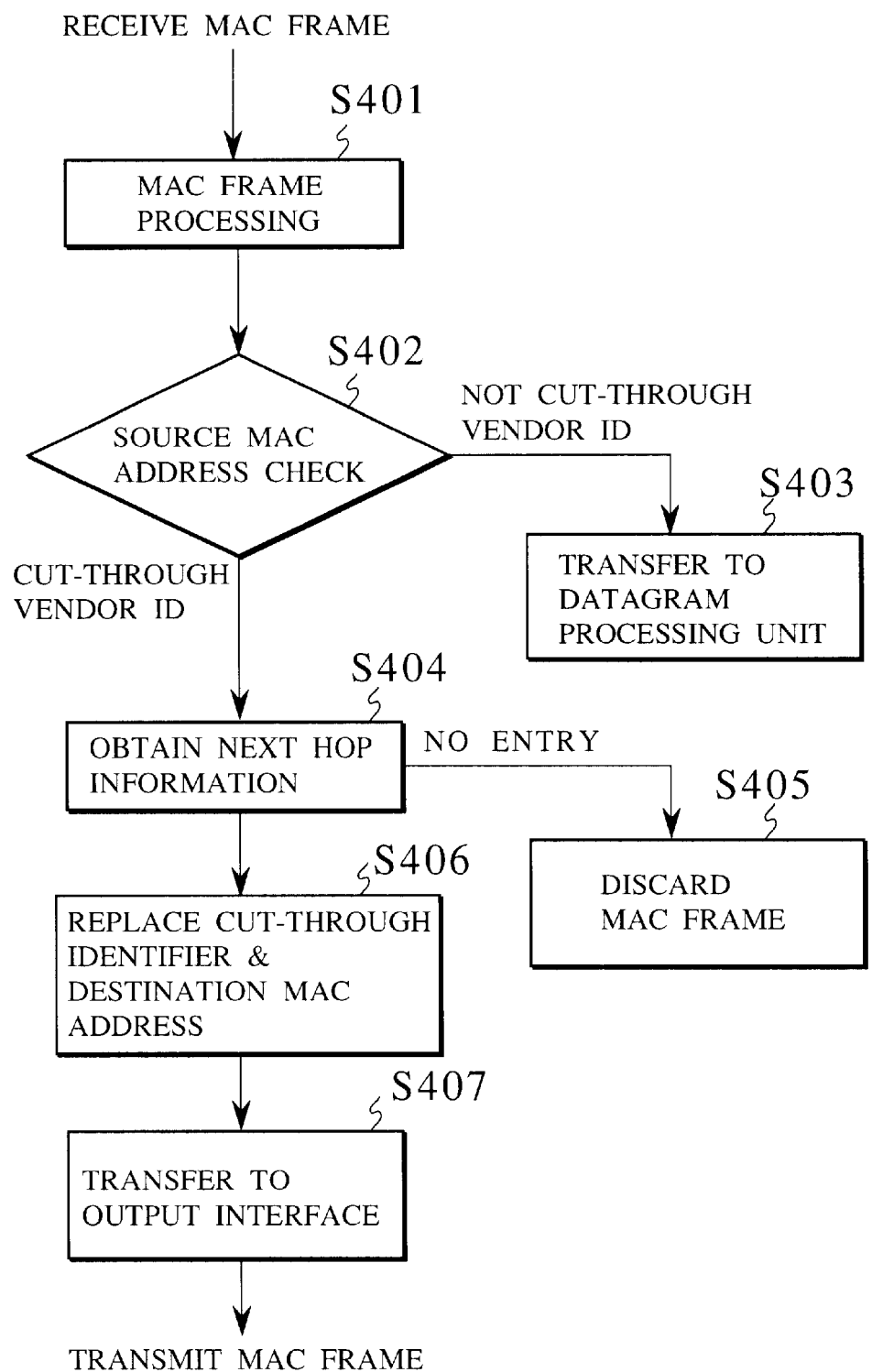
FIG. 5 is a flow chart for a datagram processing procedure to be carried out by the router device of FIG. 2 in the case of entering the cut-through MAC address into the source MAC address region.

FIG. 5 shows a datagram processing procedure to be carried out by the router device of FIG. 2 in the case of entering the cut-through MAC address into the source MAC address region. Here, an exemplary case of datagram transfer from the network interface 211 to the network interface 21N will be described.

First, the network interface 211 receives a MAC frame from the network 221. At this point, the MAC control unit 231 executes the MAC frame processing (such as a destination MAC address check, CRC check, etc.), and sends this MAC frame to the MAC judgement unit 241 when the destination MAC address of the received MAC frame is the MAC address of this router device (S401). Namely, the received MAC frame is given to the MAC judgement unit 241 regardless of whether it is an ordinary MAC frame or a cut-through MAC frame.

Note that when there exists a bridge device having a learning function on the network and this bridge device does not distinguish the ordinary MAC frame and the cut-through MAC frame, this bridge device stores (learns) information on a relationship between a MAC address and an output interface even for the cut-through MAC frame transmitted from each node which has a cut-through MAC address assigned to that node as a source MAC address.

Note also that each source node is assumed to transmit a frame by entering the cut-through MAC address assigned to itself into the source MAC address region, but each node can learn the cut-through MAC address of its neighboring node as described above, so that it is also possible to adopt a convention by which each node transmits a frame by entering the cut-through MAC address assigned to a next hop node into the source MAC address region instead.

Upon receiving the MAC frame from the MAC control unit 231, the MAC judgement unit 241 checks the vendor identifier of the source MAC address (S402), and sends the MAC frame to the flow processing unit 261 in order to carry out the cut-through transfer when the vendor identifier is the cut-through vendor identifier (S404), or sends the MAC frame to the datagram processing unit 201 in order to carry out the ordinary network layer transfer when the vendor identifier is not the cut-through vendor identifier (S403).

Next, the flow processing unit 251 refers to the next hop information table 261 so as to obtain an output network interface to which the to which this MAC frame should be sent next and a cut-through identifier and a destination MAC address to be attached to this MAC frame next, according to the cut-through identifier contained in this MAC frame (S405). The destination MAC address to be obtained here is the ordinary MAC address of a next hop node. In the case of transmitting a frame by entering the cut-through MAC address assigned to a next hop node into the source MAC address region, it is also possible to carry out the searching through the next hop information table 261 by using the datalink flow identifier as a key instead of using the cut-through identifier.

When no corresponding entry is found by the search through the next hop information table 261 by the flow processing unit 251, this MAC frame is discarded (S405). Here, in order to avoid the undesirable discarding, it is possible to adopt any of the three measures described above for a case of entering the cut-through MAC address into the destination MAC address region.

After the next hop information is obtained, the flow processing unit 251 replaces the source MAC address and the datalink flow identifier of the received MAC frame to the obtained next hop cut-through identifier (S408), and sends this MAC frame to the obtained output network interface 21N (S407).

Here, the replacement of the source MAC address and the datalink flow identifier is carried out in order to make it possible for each interface to manage the source MAC address and the datalink flow identifier independently, and this operation will be unnecessary when the source MAC address (cut-through MAC address) and the datalink flow identifier are set to be unique over all the networks. Note however that the destination MAC address (ordinary MAC address) must be replaced even in that case.

The output network interface 21N can then transfer the MAC frame exactly as received.

By the above processing, it is possible to realize the datagram transfer based on the datalink layer switching, without requiring the processing at the datagram processing unit 201.

FIG. 8 shows an exemplary configuration of the next hop information table 261 used in this case for obtaining information elements on the next hop router device or host from the cut-through identifier, in which each entry comprises a cut-through identifier field 601, an output interface field 602, a next hop destination MAC address field 603, and a next hop cut-through identifier field 604.

The cut-through identifier field 601 indicates a cut-through identifier which is to be used as a search key, although this field may be unnecessary depending on the search method adopted. As already mentioned above, it is also possible to use the datalink flow identifier as the search key instead of the cut-through identifier. The output interface field 602 indicates a network interface to which the MAC frame is to be sent next. The next hop destination MAC address field 603 indicates an ordinary MAC address of a router device or host to which the MAC frame is to be sent next, which is used when the MAC address format of FIG. 1B is used for the source MAC address. The next hop cut-through identifier field 604 indicates a cut-through identifier of the next hop which is an information element necessary when it is required to replace the header information of the received MAC that contains the cut-through MAC address and the datalink flow identifier in order to transmit this MAC frame to the next hop router device or destination host.

Here, the case where a next hop router or host does not support the newly introduced cut-through MAC frame format 131 of FIG. 1E and the case where a next hop node requires to apply the upper layer processing to the received MAC frame can be handled similarly as described above for a case of entering the cut-through MAC address into the destination MAC address region.

Note that the above description has been directed to an exemplary case where each node judges whether the cut-through transfer should be carried out or the ordinary datagram transfer should be carried out for the received MAC frame according to the cut-through vendor identifier, but it is also possible to make this judgement according to a U/L bit instead of the cut-through vendor identifier. Namely, it is possible to judge that the cut-through transfer should be carried out when the U/L bit is 1 (a case of local address and the ordinary datagram transfer should be carried out when the U/L bit is 0 (a case of universal address). In such a case, a combination of the vendor identifier and the node identifier can be used for an identification of a node within each network.

Note also that the above description has been directed to an exemplary case where all the interfaces (networks) are interfaces (networks) like those of Ethernets that transmit and receive MAC frames, but the present invention is equally applicable to a case where a network on either an input side or an output side is a virtual connection-oriented network such as ATM or frame relay in the configuration of FIG. 2. In the case of ATM network, for example, the cut-through identifier is entered into the VPI/VCI field is a cell header.

Figure 6:
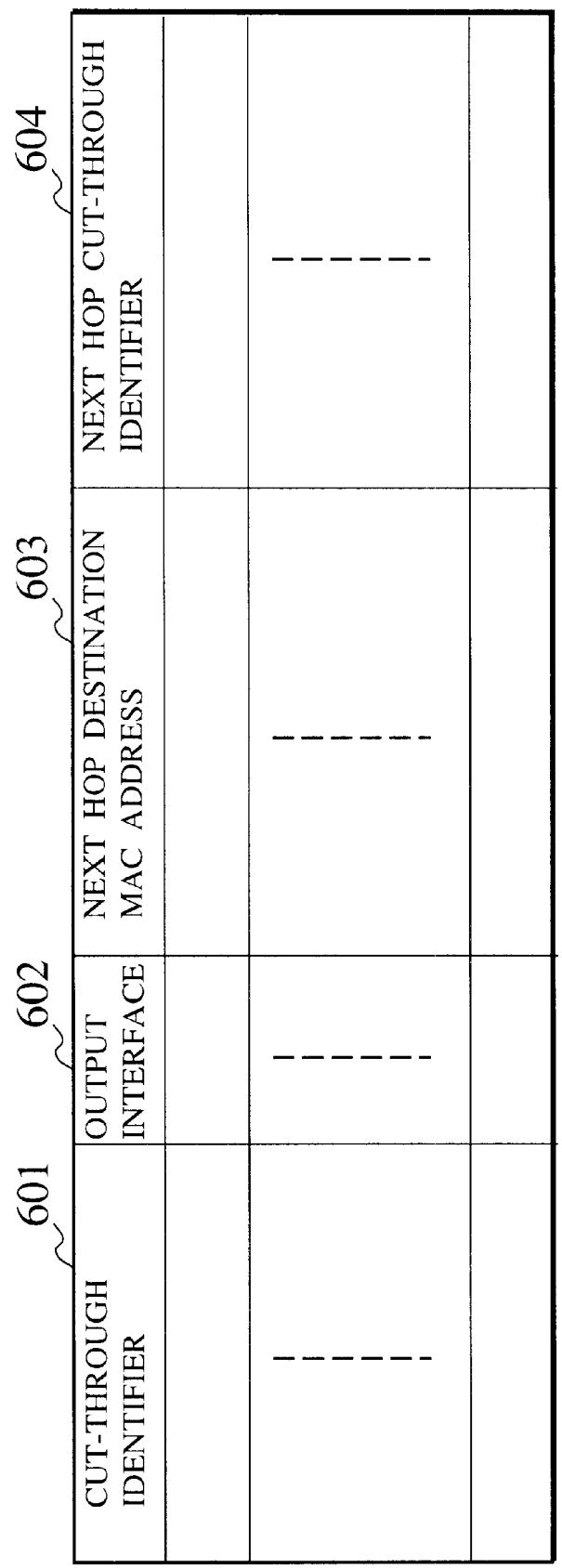
FIG. 6 is a diagram showing an exemplary configuration of a next hop information table used in the case of datagram processing procedure of FIG. 5.

For instance, when the MAC frame is received from an input side interface and an output side interface is ATM, the VPI/VCI value will be entered into the next hop cut-through identifier field in the next hop information table 261 of FIG. 4 or FIG. 6, with this provision, it becomes possible for this router to transfer a packet toward the output ATM interface by attaching a prescribed VPI/VCI value and assembling cells, simply by referring to the cut-through identifier in the header of the received MAC frame without referring to the header information such as a destination address of that packet. Here, the cell assembling can be carried out with respect to a frame with a MAC header for indicating a next hop attached thereto or a packet from which the received MAC header is removed (and a header for encapsulation is attached if necessary).

As described, according to the present invention, a virtual identifier that can be used for the datalink layer switching is conveyed by utilizing an address region and an upper layer protocol identification information region so that there is no need to re-adust or change the maximum packet length. Also, it suffices for a node, bridge, Ethernet switch, etc., to store just an information contained in the address region out of a virtual identifier necessary for the datalink layer switching, so that it is possible to reduce an amount of MAC addresses that have to be stored. Thus, according to the present invention, it becomes possible to attach a virtual identifier necessary for the switching at the datalink layer frame level switching, without causing a need for re-adjusting or changing a packet length or a need for storing many datalink layer addresses at node, bridge, Ethernet switch, etc.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A router device, comprising:
    a receiving unit for receiving a frame to be transferred by a datalink layer level switching, said frame having a datalink flow identifier for identifying a flow of a packet corresponding to said frame on a datalink layer, the datalink flow identifier being contained in a prescribed region of said frame corresponding to an upper layer protocol identification information region of a frame format for frames to be transferred via a network layer processing;
    a memory unit for storing a correspondence of the datalink flow identifier and an address information of a next hop node to which frames of packets belonging to said flow are to be transferred next; and
    a datalink layer level transfer unit for transferring said frame received from a previous hop node belonging to one logical network by the receiving unit to the next hop node belonging to another logical network, by obtaining the address information of the next hop node by referring to the correspondence stored by the memory unit using at least the datalink flow identifier contained in said prescribed region of said frame as a key, and by attaching the address information of the next hop node to said frame, without carrying out the network layer processing.

2. The router device of claim 1, wherein the receiving unit also receives another frame to be transferred via the network layer processing from a previous hop node, and the device further comprises:
    a network level transfer unit for transferring said another frame to a next hop node by assembling another packet from said another frame and applying the network layer processing to said another packet.

3. The router device of claim 2, wherein each frame received by the receiving unit has an information having different values for a first type frame to be transferred by the datalink layer level switching and a second type frame to be transferred via the network layer processing, and the device further comprises:
    a judging unit for judging whether each frame received by the receiving unit is the firs type frame or the second type frame according to said information, and sending the first type frame to the datalink layer level transfer unit while sending the second type frame to the network layer level transfer unit.

4. The router device of claim 3, wherein the judging unit obtains said information by extracting a plurality of bits at prescribed positions within an address region of each frame received by the receiving unit.

5. The router device of claim 1, wherein the memory unit stores the address information of the next hop node in a form of a next hop cut-through identifier to be used in identifying said flow on the datalink layer at the next hop node, and the datalink layer level transfer unit rewrites the datalink flow identifier in the prescribed region according to the next hop cut-through identifier obtained from the memory unit.

6. The router device of claim 5, wherein the datalink layer level transfer unit also rewrites a destination address of said frame according to the next hop cut-through identifier obtained from the memory unit.

7. The router device of claim 5, wherein the datalink layer level transfer unit also rewrites a source address of said frame according to the next hop cut-through identifier obtained from the memory unit.

8. The router device of claim 5, wherein the next hop cut-through identifier is formed by another datalink flow identifier and a cut-through node identifier for identifying the next hop node or the router device which is to be used exclusively for a transfer by the datalink layer level switching and assigned to the next hop node or the router device in advance.

9. The router device of claim 5, wherein the next hop cut-through identifier is stored by exchanging with the next hop node a message for establishing a correspondence between the next hop cut-through identifier and a flow identification information for identifying said flow on a network layer.

10. The router device of claim 1, wherein the memory unit stores the address information of the next hop node in a form that includes a protocol identification information for identifying an upper layer protocol of the packet corresponding to said frame, when the next hop node does not support transfer by the datalink layer level switching, and the datalink layer level transfer unit enters the protocol identification information into the prescribed region according to the address information obtained from the memory unit.

11. The router device of claim 10, wherein the memory unit stores the address information of the next hop node in a form that also includes a next hop address fixedly assigned to the next hop node.

12. The router device of claim 1, wherein the memory unit stores the address information of the next hop node in a form that contains a next hop address fixedly assigned to the next hop node, when a next hop cut-through identifier to be used in identifying said flow on the datalink layer at the next hop node is not known at the router device.

13. The router device of claim 1, wherein said frame received by the receiving unit has a destination address region that contains a cut-through node identifier for identifying the router device which is to be used exclusively for a transfer by the datalink layer level switching and assigned to the router device in advance, and the datalink layer level transfer unit rewrites the destination address region of said frame according to the address information obtained from the memory unit.

14. The router device of claim 13, wherein the receiving unit stores the cut-through node identifier of the router device, and receives an arriving frame when the arriving frame has the destination address region that contains the cut-through node identifier of the router device.

15. The router device of claim 14, further comprising:
a unit for transmitting a frame having a source address region that contains the cut-through node identifier of the router device toward the previous hop node when the datalink switch for routing frames according to destination addresses exists between the router device and the previous hop node, so as to enable the datalink switch to route the frames according to destination addresses that contain the cut-through node identifier of the router device.

16. The router device of claim 1, wherein said frame received by the receiving unit has a source address region that contains a cut-through node identifier for identifying the router device or the previous hop device which is to be used exclusively for a transfer by the datalink layer level switching and assigned to the router device or the previous hop device in advance, and the datalink layer level transfer unit rewrites the source address region of said frame according to the address information obtained from the memory unit.

17. The router device of claim 16, wherein the memory unit stores the address information of the next hop node in a form of a next hop cut-through identifier to be used in identifying said flow on the datalink layer at the next hop node and a next hop node address, and the datalink layer level transfer unit rewrites the source address region and the datalink flow identifier in the prescribed region according to the next hop cut-through identifier obtained from the memory unit while rewriting a destination address region according to the next hop node address obtained from the memory unit.

18. The router device of claim 1, wherein the memory unit stores the correspondence in terms of a cut-through identifier formed by the datalink flow identifier and a cut-through node identifier for identifying the router device or the previous hop node which is to be used exclusively for a transfer by the datalink layer level switching and assigned to the router device or the previous hop node in advance.

19. The router device of claim 18, wherein the cut-through identifier is stored by exchanging with the previous hop node a message for establishing a correspondence between the cut-through identifier and a flow identification information for identifying said flow on a network layer.

20. A method of frame transfer at a router device, comprising the steps of:
(a) storing a correspondence of a datalink flow identifier for identifying each flow on a datalink layer and an address information of a next hop node to which frames of packets belonging to each flow are to be transferred next in a memory of the router device;
(b) receiving a frame to be transferred by a datalink layer level switching, said frame having the datalink flow identifier for identifying a flow of a packet corresponding to said frame on the datalink layer, the datalink flow identifier being contained in a prescribed region of said frame corresponding to an upper layer protocol identification information region of a frame format for frames to be transferred via a network layer processing; and
(c) transferring said frame received from a previous hop node belonging to one logical network by the step (a) to the next hop node belonging to another logical network, by obtaining the address information of the next hop node by referring to the correspondence stored by the memory using at least the datalink flow identifier contained in said prescribed region of said frame as a key, and by attaching the address information of the next hop node to said frame, without carrying out the network layer processing.

21. The method of claim 20, wherein the step (b) also receives another frame to be transferred via the network layer processing from a previous hop node, and the method further comprises the step of:
(a) transferring said another frame to a next hop node by assembling another packet from said another frame and applying the network layer processing to said another packet.

22. The method of claim 21, wherein each frame received by the step (b) has an information having different values for a first type frame to be transferred by the datalink layer level switching and a second type frame to be transferred via the network layer processing, and the method further comprises the step of:
(a) judging whether each frame received by the step (b) is the first type frame or the second type frame according to said information, and sending the first type frame to the step (c) while sending the second type frame to the step (d).

23. The method of claim 22, wherein the step (e) obtains said information by extracting a plurality of bits at prescribed positions within an address region of each frame received by the step (b).

24. The method of claim 20, wherein the step (a) stores the address information of the next hop node in a form of a next hop cut-through identifier to be used in identifying said flow on the datalink layer at the next hop node, and the step (c) rewrites the datalink flow identifier in the prescribed region according to the next hop cut-through identifier obtained from the memory.

25. The method of claim 24, wherein the step (c) also rewrites a destination address of said frame according to the next hop cut-through identifier obtained from the memory.

26. The method of claim 24, wherein the step (c) also rewrites a source address of said frame according to the next hop cut-through identifier obtained from the memory.

27. The method of claim 24, wherein the next hop cut-through identifier is formed by another datalink flow identifier and a cut-through node identifier for identifying the next hop node or the router device which is to be used exclusively for a transfer by the datalink layer level switching and assigned to the next hop node or the router device is advance.

28. The method of claim 24, wherein the next hop cut-through identifier is stored by exchanging with the next hop node a message for establishing a correspondence between the next hop cut-through identifier and a flow identification information for identifying said flow on a network layer.

29. The method of claim 20, wherein the step (a) stores the address information of the next hop node in a form that includes a protocol identification information for identifying an upper layer protocol of the packet corresponding to said frame, when the next hop node does not support transfer by the datalink layer level switching, and the step (c) enters the protocol identification information into the prescribed region according to the address information obtained from the memory.

30. The method of claim 29, wherein the step (a) stores the address information of the next hop node in a form that also includes a next hop address fixedly assigned to the next hop node.

31. The method of claim 30, wherein the step (a) stores the address information of the next hop node in a form that contains a next hop address fixedly assigned to the next hop node, when a next hop cut-through identifier to be used in identifying said flow on the datalink layer at the next hop node is not known at the router device.

32. The method of claim 20, wherein said frame received by the step (b) has a destination address region that contains a cut-through node identifier for identifying the router device which is to be used exclusively for a transfer by the datalink layer level switching and assigned to the router device in advance, and the step (c) rewrites the destination address region of said frame according to the address information obtained from the memory.

33. The method of claim 32, further comprising the step of:
(f) storing the cut-through node identifier of the router device, so that the step (b) receives an arriving frame when the arriving frame has the destination address region that contains the cut-through node identifier of the router device.

34. The method of claim 33, further comprising the step of:
(g) transmitting a frame having a source address region that contains the cut-through node identifier of the router device toward the previous hop node when a datalink switch for routing frames according to destination addresses exists between the router device and the previous hop node, so as to enable the datalink switch to route the frames according to destination addresses that contain the cut-through node identifier of the router device.

35. The method of claim 20, wherein said frame received by the step (b) has a source address region that contains a cut-through node identifier for identifying the router device or the previous hop device which is to be used exclusively for a transfer by the datalink layer level switching and assigned to the router device or the previous hop device in advance, and the step (c) rewrites the source address region of said frame according to the address information obtained from the memory.

36. The method of claim 35, wherein the step (a) stores the address information of the next hop node in a form of a next hop cut-through identifier to be used in identifying said flow on the datalink layer at the next hop node and a next hop node address, and the step (c) rewrites the source address region and the datalink flow identifier in the prescribed region according to the next hop cut-through identifier obtained from the memory while rewriting a destination address region according to the next hop node address obtained from the memory.

37. The method of claim 20, wherein the step (a) stores the correspondence in terms of a cut-through identifier formed by the datalink flow identifier and a cut-through node identifier for identifying the router device or the previous hop node which is to be used exclusively for a transfer by the datalink layer level switching and assigned to the router device or the previous hop node in advance.

38. The method of claim 37, wherein the cut-through identifier is stored by exchanging with the previous hop node a message for establishing a correspondence between the cut-through identifier and a flow identification information for identifying said flow on a network layer.

* * * * *